Patented Aug. 5, 1947

2,425,151

UNITED STATES PATENT OFFICE 2,425,151

METHOD OF PREPARING AIR-SETTING REFRACTORY MORTARS

Herbert H. Greger, Washington, D. C.

No Drawing. Application December 2, 1943, Serial No. 512,637

5 Claims. (Cl. 106—67)

This invention relates to refractory mortars and more particularly has reference to a method of preparing in a dry form such mortars which upon plasticizing with water are capable of air setting at room temperature and above to produce bodies and joints having high strength and usefulness.

A refractory mortar consists essentially of a refractory filler, such as, ceramic grog, a bond clay and some water to produce sufficient plasticity for trowelling or other methods of handling. Upon drying the ceramic filler is bonded by the clay in the mixture. At temperatures below actual vitrification of the mass the clay is naturally rather weak and, therefore, the clay mortar has certain service limitations which may in some cases considerably reduce its usefulness.

In order to prevent the formation of a bond having low strength at temperatures below red heat, certain additional binders, such as organic or inorganic bonding substances may be added to the mortar to effect a cementing of the clay and grog into a more strongly bonded mass. Sodium silicate has been added to achieve such cementing action. It is well known that the sodium silicate may be added to such mortars either in form of a solution or in dry water soluble form, thus producing either a wet or a dry mortar.

There are certain advantages connected with the commercial use of dry mortars which reside principally in reduced shipping cost, due to low moisture content, reduced cost of packaging and the like but they also have certain disadvantages. These consist chiefly in the instability of the silicate of soda when exposed to the atmosphere and the transformation of its soda content into sodium carbonate. The useful binding action of the silicate is then largely lost and a mortar of low air-set binding strength is formed.

Another disadvantage is the physical form of the water soluble silicate in which this is applied. In order to produce a water soluble solid silicate of soda, its solutions are spray dried under controlled conditions to form a solid containing about 18% of moisture. This type of processing is expensive and produces a product of somewhat cellular structure and of such large surface area that the absorption of moisture and carbon dioxide from the air is greatly facilitated.

The principal object of the present invention is the production of a dry air setting refractory mortar which avoids the disadvantages of the prior art.

Another object of the invention is to provide a method of producing an improved refractory mortar product.

A further object of the invention is to provide a modified method for drying silicate of soda solutions for purposes of producing dry air setting mortars.

A still further object of the invention is the preparation of a new product by processing of grog or other ceramic filler with silicate of soda.

It is also an object of the invention to prepare a new product by processing of grog or other ceramic filler with a water soluble aluminum phosphate.

With these and other objects in view the present invention concerns the manufacture of dry air-setting mortars containing silicate of soda in a solid water soluble form and in suitable methods of treatment of component ingredients.

In accordance with the present invention an air setting mortar is made by processing and drying together a ceramic grog or other refractory material with silicate of soda solutions and then adding to this mixture a suitable refractory clay. This dry mixture is plasticized by water before use and after application is left to air dry and set, for instance, in the construction of a kiln wall. The strength obtained by this air set is maintained and gradually increased when the product is heated to 100° C. and above to higher temperatures where the ceramic bond develops.

The dry air-setting mortars usually contain on a dry basis up to about 15% of water soluble sodium silicate in powder form. Various soda to silica ratios are in use for this purpose and it is a matter of choice which of these silicates are applied. Generally speaking, the refractoriness of the mortar is increased the less $Na_2O$ is contained in the silicate.

For purposes of this invention, the liquid sodium silicate solutions are used. These solutions are obtainable in certain concentrations which vary usually between 33.5 to 69° Bé. and contain between 31 to 62% solids.

A refractory mortar further contains an essentially volume stable refractory grog or other suitable filler of low porosity. The grain size is kept at less than 35 mesh for good workability, but the grain sizes are graded to give maximum density as shown in the following example:

Example 1

| | Parts |
|---|---|
| —35+48 mesh grog | 5 |
| —48+100 mesh grog | 5.4 |
| —100 mesh grog | 37.9 |
| Kaolin | 15.5 |
| Kentucky ball clay No. 4 | 5.2 |
| Silicate of soda ($Na_2O:SiO_2=1:2$) | 20 |

Clays are added to this grog and together with the silicate of soda they form the actual bond after plasticization with water. After drying, a hard and dense mass difficult for water to penetrate is formed.

I have found that silicate of soda solutions and the grog, but in the absence of the clay, can be processed together by a mixing and a subsequent drying step to give a silicate coated grog. The drying can be so regulated by suitable temperature control that the silicate of soda remains soluble in water. The grog itself stays inert during the drying step except for a minor etching of its surface by the alkali. In this manner the silicate solution is spread in a thin film over the surface of the grog and the water can be quickly eliminated from this film to give a dry silicate containing approximately 18% or even more of residual water.

In the drying of silicate of soda solutions it is necessary to reduce the silicate to such thin films or to very small droplets because during the elimination of the water the solution thickens quickly and forms in relatively thick layers a nearly impervious skin. In this case the solutions must be heated to above the boiling point to rupture the skin and to eliminate more water. While this is done to some extent also in spray drying the danger there of overheating is rather limited.

It was found that in the ratios of grog to silicate of soda, which are generally applied in refractory mortars, the film thickness of the silicate solution on the grog surface is thin enough to permit rapid drying in customary standard drying equipment, such as a rotary or other type of drier. The finer mesh fractions in the grog are cemented together to some extent, but the product disintegrates readily on application of water. A certain quantity of relatively large aggregate may form which, however, consists in the absence of pressure of very loosely bonded and porous mass. These aggregates, however, break up very readily with the application of mild pressure.

The drying process of coated grog is dependent on both temperature and a time factor, the latter being dependent to a large extent on suitable agitation of the drying mass. While these factors will vary considerably with the type of equipment a drying temperature of between 200 to 350° F. may be applied.

If the grog is relatively porous it is necessary to use the silicate solution in a very viscous form in order to prevent it from penetrating the pores and becoming lost.

After these operations are completed, the necessary quantity of clay is added. By suitable choice of equipment, such as a muller type of mixer, the loose lumps in the dried aggregate can be crushed and simultaneously mixed with the clay.

This method of processing has been found useful as a means of more closely controlling the water content and the solubility of the silicate and in this manner provide for improved handling of the mortar during and after plasticization. Furthermore the silicate and the finished product is not quite as fully exposed to the atmosphere and its storage life may therefore be extended because of the reduction in the exposed surface.

The concept of the present invention may also be applied to the preparation of refractory mortars having aluminum phosphate binders incorporated therein. In this connection, ceramic grog may be mixed with aqueous solutions of aluminum phosphates to effect a coating of the aluminum phosphate solution over the surfaces of the grog or other filler. The so coated material may then be dried at temperatures of 200 to 300° F. The aluminum phosphate coated grog after drying may be broken up and mixed with clay to form a dry mortar. When it is desired to use the mortar, it is only necessary to mix it with sufficient water to plasticize the same.

This method of drying the binder on the surface of the grog has several advantages. The initial coating with a concentrated binder solution causes an improved wetting and adhesion of the binder to the surfaces of the grog or other filler, permits an even distribution of the binder and prevents its segregation in the compounded dry mortar due to vibration or other causes. It further assures a uniform film thickness of the binder and consequently becomes a means of controlling, within certain limits, the rate of redispersion of the binder in water. This will assist considerably in readily preparing a mortar of the desired usable consistency and uniformity.

Another important advantage resides in the drying method itself, since the binder is spread over the grog or filler in a thin even film and therefore dries very quickly and uniformly and at lower temperatures than if dried by itself in a relatively thick layer where the continuous formation of a surface film retards the vaporization of the water.

This procedure is applied principally to binder compositions which are conveniently prepared in form of solutions, ranging between the mono- and the sequi-aluminum phosphate. This range may be extended to the di-aluminum phosphate by the addition of aluminum chloride, sulfate or nitrate.

In practice a solution of the binder is mixed in a mechanical mixer with the total grog in the desired proportion of mesh sizes. The mixture is then dried in a conventional drier at 180–300° F. The drying time for the thin film of binder on the grog is very short and the procedure eliminates the need of specialized equipment, such as a flaking machine or spray drier, for drying the viscous and tacky binder. At the same time, the necessary coating of the grog is accomplished.

This invention may be applied to refractory mortars having various forms of aluminum phosphate as binding agents. It has been found that refractory mortars having the following compositions exhibit desired properties.

*Example 2*

| | Parts |
|---|---|
| −35+48 mesh calcined Kyanite (cone 35—36) | 6.5 |
| −48+100 mesh calcined Kyanite | 26.0 |
| −100 mesh calcined Kyanite | 19.4 |
| Kaolin (Taco clay) (cone 35) | 13.3 |
| Kentucky ball clay No. 4 (cone 32) | 8.9 |
| Water | 18.5 |
| Mono-aluminum phosphate binder | 7.4 |
| | 100.0 |

P. C. E. value 34.

*Example 3*

| | Parts |
|---|---|
| −35+48 mesh calcined Kyanite (cone 35—36) | 6.5 |
| −48+100 mesh calcined Kyanite | 26.0 |
| −100 mesh calcined Kyanite | 19.4 |
| Kaolin (Taco clay) (cone 35) | 22.2 |
| Water | 18.5 |
| Sesqui-aluminum phosphate binder | 7.4 |
| | 100.0 |

P. C. E. value 34.

Example 4

| | Parts |
|---|---|
| −35+48 mesh grog (cone 35) | 5.0 |
| −48+100 mesh grog (cone 35) | 5.4 |
| −100 mesh grog (cone 35) | 37.9 |
| Kaolin (Taco clay) (cone 35) | 15.5 |
| Kentucky Ball clay No. 4 (cone 32) | 5.2 |
| Water | 20.7 |
| Aluminum phosphate (ratio 1¼$Al_2O_3$ to 3$P_2O_5$) from bauxite containing 18% $SiO_2$ and about 1% $Fe_2O_3$ | 10.3 |
| | 100.0 |

P. C. E. value 34.

A very effective mortar of the dry type can be produced by drying the liquid aluminum phosphate binder on the grog or Kyanite. Twenty percent of the liquid binder containing 50% solid aluminum phosphate was used and mixed in a mechanical mixer with the kyanite in the mesh sizes given in Example 4. The resulting tacky mixture was fluffy and dried well in an oven at 250° F. within 1½ to 2 hours. Occasional stirring naturally promotes drying.

In commercial practice, the mixture of kyanite and binder may be dried on a wire screen belt in a tunnel drier and since the material is quite fluffy warm air may be blown through it and thus the drying time could be considerably reduced.

After breaking the loose aggregate up to a particle size of through 20 mesh, it was mixed with the necessary amount of clay. This mixture is the dry mortar ready for packaging. For use it is mixed with water. If a power mixer is available, about 15 minutes of mixing time were found sufficient to dissolve the phosphate. The less effective hand mixing methods with a hoe take somewhat longer. If maximum strength is wanted, an aging period of 12 to 24 hours is recommended.

From the foregoing description, it will be appreciated that the present invention provides a novel method of preparing refractory mortars in a dry state which have many advantages over prior methods of preparing such mortars.

I claim:

1. An air hardening refractory mortar comprising a dry composition formed of an inert refractory filler, the particles of which are coated with a water soluble aluminum phosphate, and clay.

2. An air hardening refractory mortar comprising a dry composition formed of an inert refractory filler, the particles of which are coated with a water soluble aluminum phosphate binder, and clay.

3. A composition for admixture with clay and water to form an air hardening refractory mortar comprising inert refractory particles coated with a water soluble aluminum phosphate.

4. A method of making a refractory mortar comprising coating inert refractory particles with a solution of water soluble aluminum phosphate selected from the range of aluminum phosphates lying between mono- and di-aluminum phosphate, drying the coated particles, and mixing the coated particles with clay and water.

5. A method of preparing a composition for admixture with clay and water to form an air hardening refractory mortar comprising coating inert refractory particles with a solution of water soluble aluminum phosphate selected from the range of aluminum phosphates lying between mono- and di-aluminum phosphate, drying the coated particles, and breaking apart any agglomerated particles.

HERBERT H. GREGER.

REFERENCES CITED

The following references are of record in the file of this patent:

UNITED STATES PATENTS

| Number | Name | Date |
|---|---|---|
| 2,218,058 | Stalhane | Oct. 15, 1940 |
| 2,019,618 | McKinley et al. | Nov. 5, 1935 |
| 2,102,327 | McKinley et al. | Dec. 14, 1937 |
| 281,159 | Tatham | July 10, 1883 |
| 1,339,266 | Linbarger | May 4, 1920 |
| 1,653,123 | Rentschler | Dec. 20, 1927 |
| 1,307,197 | Hanson et al. | June 17, 1919 |
| 1,924,743 | Lux | Aug. 29, 1933 |
| 1,576,550 | Rochow | Mar. 16, 1926 |
| 771,184 | Steenbock | Sept. 27, 1904 |
| 2,057,678 | Gundlach | Oct. 20, 1936 |
| 225,817 | Fletcher | Mar. 23, 1880 |
| 1,316,071 | Zukoski | Sept. 16, 1919 |

FOREIGN PATENTS

| Number | Country | Date |
|---|---|---|
| 2,075 | Australia | 1931 |
| 127,605 | Austria | 1932 |
| 60,384 | Norway | 1939 |
| 1,628 | Great Britain | 1883 |
| 462,781 | Great Britain | 1937 |
| 629,450 | France | 1927 |
| 630,131 | Germany | 1936 |
| 18,820 | Great Britain | 1911 |
| 98,591 | Sweden | 1940 |
| 18,899 | Great Britain | 1894 |
| 430,624 | Great Britain | 1935 |
| 48,264 | Austria | 1911 |
| 146,917 | Austria | 1936 |
| 337,856 | Germany | 1921 |